Feb. 11, 1930.　　　　G. H. RIDGE　　　　1,747,084
EARTH CURRENT CORRECTOR FOR CABLE SIGNALS
Filed Jan. 18, 1928
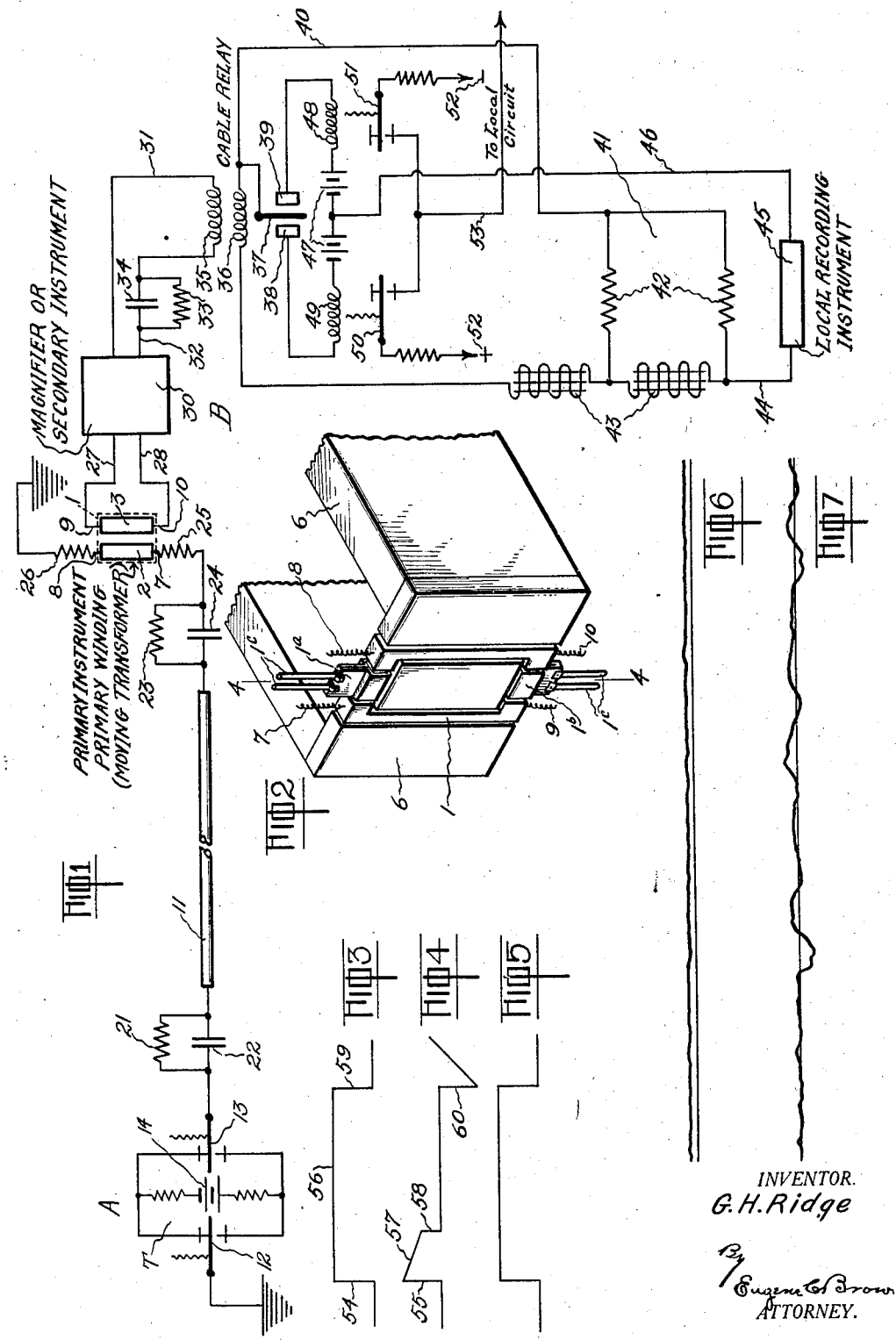
INVENTOR.
G.H.Ridge
By Eugene C. Brown
ATTORNEY.

Patented Feb. 11, 1930

1,747,084

UNITED STATES PATENT OFFICE

GUY H. RIDGE, OF FAR ROCKAWAY, NEW YORK, ASSIGNOR TO THE WESTERN UNION TELEGRAPH COMPANY, OF NEW YORK, N. Y., A CORPORATION OF NEW YORK

EARTH-CURRENT CORRECTOR FOR CABLE SIGNALS

Application filed January 18, 1928. Serial No. 247,600.

My invention relates to methods of and apparatus for operating communicating systems, and more particularly telegraph cable systems.

Owing to the large static capacity of ocean cables, difficulties are frequently experienced due to earth currents flowing as a result of the difference of earth potential between the two grounding points of the system. These earth currents tend to slowly bias or swing the receiving device out of its true or zero position, and as a result render the telegraph signals unintelligible.

Heretofore, attempts to nullify the effect of earth currents in cable systems have been accomplished by providing either leakage paths therefor, or generating counterelectromotive forces in accordance with the difference of voltage between the two grounding points of the system, as well as other more complicated methods. Such arrangements entail not only considerable complications but result in a loss of signal energy.

Whereas the earth currents are of comparatively low frequency and accordingly build up a charge at a slow rate, on the other hand telegraph signals have steep wave fronts and are of comparatively high frequency. Particularly is this true of signals in the form of block signals wherein the successive unit impulses of like character are merged into a single prolonged impulse having a length or period equal to the number of like unit impulses in the signal character when wave correcting circuits are employed. Advantage can be taken of this characteristic difference between the telegraph signals and earth currents to separate the two, permitting only telegraph signals to reach the receiving apparatus.

Accordingly, an object of my invention is to provide means in a telegraph system for repeating received telegraph signals to a receiver while preventing low frequency earth currents from reaching the receiver.

A further object of my invention is to provide simple and reliable means for compensating for differences of potential between the grounds at opposite ends of a signaling system.

Another object of my invention is to provide means for employing transformer connections which will repeat telegraph signals but will not repeat low frequency earth currents.

Inasmuch however, as the received telegraph signals flowing in the primary winding of a transformer are very weak, they will not suffice to produce impulses of sufficient amplitude for practical purposes in the secondary of a transformer. That is, if the ordinary telegraph signal is passed through the primary of a standard transformer, the output from the secondary winding is practically negligible unless highly amplified.

I overcome this disadvantage of a transformer by mounting the coils for movement in a magnetic field to thereby produce a motor generator effect. When the windings of the transformer rotate in the field, lines of force are cut and a current is generated in the secondary winding of considerably greater magnitude than is obtained in a stationary transformer.

By this operation the electrical energy of the received signal is translated into mechanical kinetic energy which in turn is retranslated into electrical energy. If the windings of the transformer are properly arranged in carrying out these steps, a comparatively weak received signal can be translated into a momentary energy of much greater magnitude.

Another object of my invention is to provide means for repeating received signals of sufficient magnitude to operate cable relays while not repeating earth currents.

A still further object of my invention is to provide means for translating the energy of the received signals into short period signals of large magnitude.

In the following detailed description I shall refer to the accompanying drawings, in which:—

Figure 1 is a circuit diagram of a preferred embodiment of my invention.

Figure 2 is a perspective view showing of a moving transformer employed in one embodiment of my invention.

Figure 3 is a diagrammatic illustration of a block signal received in the primary winding of the moving transformer or motor generator.

Figure 4 shows the wave shape of the same signal in the output or secondary of the transformer.

Figure 5 shows the wave form of the impulse signals reconverted into form of the original block signal, by the cable relay for operating the local recorder.

Figure 6 is a reproduction of an oscillograph record taken of the current in the secondary of the transformer when the coils are held stationary.

Figure 7 is a copy of an oscillograph record of the current in the secondary of the transformer when the coils are free to move in a magnetic field.

I will first describe the moving coil transformer shown in Figure 2. This comprises a primary winding 2 and secondary winding 3, (shown diagrammatically in Fig. 1), bound together into a coil 1, and secured at the top and bottom by clips 1$^a$, 1$^b$ carrying prongs 1$^c$ by which the coil is suspended for movement about its vertical axis 4.

Leads 7 and 8 extend from the primary winding 2 to the signaling cable and ground as indicated in Figure 1. Leads 9 and 10 extending from the secondary winding 3 are connected to a cable relay through suitable means as hereinafter described.

In accordance with the usual transformer action when the rate of current flow through the primary winding 2 is changed, a voltage is generated in the secondary winding 3 which is a function of the rate of change of the current in the primary winding 2. As pointed out above, however, although telegraph signals with steep wave fronts may pass through the primary winding, the current produced in the secondary winding is of negligible amplitude. This is illustrated in Figure 6 which is a reproduction of an oscillograph record of the currents which flow in the secondary winding 3 of the transformer when received signalling currents are flowing through the primary winding and the coils are held stationary. If, however, the transformer windings are free to rotate in a magnetic field as shown, then a motor generator action is produced. When signaling current flows in the primary winding 2, the coil 1, which includes the primary and secondary windings, is rotated in the magnetic field due to the motor action of the current. As the secondary windings 3 cut the lines of magnetic force flowing between the poles of the permanent magnet 6, a voltage is generated in the secondary winding which is proportional to the rate at which the lines of force are cut. The voltage generated as a result of the rotation of the coil in the magnetic field and the voltage due to the transformer action may be cumulative thereby producing a flow of current in the secondary winding 3, whcih is of considerably greater magnitude than in the first described case, in which there was no movement of the transformer in a magnetic field. The current generated in the secondary winding 3 is illustrated in Figure 7 which shows the reproduction of an oscillograph record of the current flow in the secondary when signals are received in the primary winding of a moving transformer such as shown in Figure 2. It will be noted from the above description that the energy of the received signal is translated into mechanical energy through electromagnetic means, causing the rotation of the coil and the rotation of the secondary winding 3 in a magnetic field to retranslate the energy into an electrical current. By properly arranging the primary and secondary windings 2 and 3, the electrical energy developed in the secondary may be momentary and of comparatively great magnitude.

Referring more particularly to Figure 1, a cable 11 is shown connecting a transmitting station A with a receiving station B. At the transmitting station A, a transmitter comprising armatures 12 and 13 of sending relays (not shown) are connected in a well known manner for impressing positive and negative polarity from the battery 14 on the cable 11.

Interposed between the transmitter and the cable 11 is a wave form correcting circuit comprising a resistance 21 and a sending condenser 22 which function to modify the transmitted signal so as to produce a wave form at the receiving end of the most desirable character.

At the receiving end the cable 11 is connected to a similar wave correcting circuit comprising a shunt resistance 23 and a receiving condenser 24 designed for correcting the wave shape of the received signals to produce a signal with a steep wave front in a manner now well known. This shunt circuit is connected through a resistance 25 to lead 7 of the primary winding 2 of the moving transformer. The opposite lead 8 of the primary winding 2 is connected through a resistance 26 to ground.

It will be noted from the above description that the direct telegraph circuit includes the primary winding 2 of the moving transformer, so that signaling impulse currents transmitted as a result of the operation of the transmitter armatures 12 and 13 are completed through the primary winding 2 of the transformer.

The secondary winding 3 of the moving coil transformer is connected by means of conductors 27 and 28 to an amplifier or a secondary instrument 30 of any well known type for amplifying the currents flowing in conductors 27 and 28, these amplified currents now flowing over conductors 31 and 32 in the output circuit of amplifier 30. The output conductors 31 and 32 are connected through a shunt resistance 33 and local condenser 34, which corrects the wave form of the signals in these conductors, to a cable receiving relay, comprising a main winding 35 connected to conductor 31 and to conductor 32 through the network 33 and 34 and a second winding 36, connected in a local correction and locking circuit to be described in detail hereinafter.

Armature 37 of the cable relay is normally maintained in a neutral position as shown and operated to either of its contacts 38 or 39 in accordance with the direction of current flowing in windings 35 and 36, these windings being so designed that currents flowing in winding 36 provides only sufficient magnetic force to hold armature 37 in engagement with whichever contact it is at that time closing, while the current which flows in winding 35 is sufficient to move the armature 37 to either contact 38 or 39 or if the armature is in engagement with either contact under control of the holding winding 36, to move the armature from this engagement to its neutral position.

Armature 37 is connected over conductor 40 through local correcting circuit 41, (comprising resistances 42 and impedances 43 which correct the wave shape of the signals in this circuit) and to the secondary winding 36 of the cable relay 34. The return circuit for relay winding 36 is completed over conductor 44, connected to a local recording instrument 45 of any well known type, the latter being connected over conductors 46 to the mid-terminal of receiving station battery 47. One terminal of battery 47 is connected through the winding 48 of a local relay to contact 39 and the opposite terminal of the battery 47 is connected through winding 49 of a local relay to contact 38. The armatures 50 and 51 of local relays 48 and 49 determine the polarity of the impulses impressed from battery 52 on the local circuit conductor 53, the latter being connected to any desired signaling devices.

In operation, as impulses of positive or negative polarity are impressed upon the cable 11 by the operation of the transmitter T, the coil 1, comprising the transformer windings 2 and 3, at the receiving station B is rotated in the magnetic field of the magnet 6. Block signals transmitted over the cable and flowing through the primary winding 2 will take the form shown in Figure 3. Due to the steep wave front 54 of this signal, the coil 1 is rotated with a sudden quick movement in the magnetic field thereby generating a current in the secondary winding 3 which will combine with the current produced therein by the inductive action of the current flowing in the primary winding 2. This combined transformer and generator action produces a steep wave front current in the secondary winding as illustrated at 55 in Figure 4.

It will be noted that immediately following the impression of the signal, the current flow becomes constant as shown at 56 in Figure 3. Since there is no change in the rate of flow of current in the primary winding 2, there will be no transformer action at this time. The rotation of coil 2 will also decelerate at this time as it approaches its angle of deflection for this value of current and accordingly the voltage generated in the secondary winding 3 will decrease as shown at 57 Figure 4 and then suddenly drop to zero as shown at 58 when the coil 1 comes to rest.

This current impulse in the secondary winding 3 flows over conductors 27 and 28 to the input of the amplifier instrument 30 and from there is repeated over the conductors 31 and 32 through the correcting unit 33 and 34 to the main winding 35 of the cable relay, causing armature 37 to move from its neutral position to engage one of its contacts. Assuming that the impulse is of such a polarity as to operate the armature 37 into engagement with its right hand contact 39, a circuit is completed from the right hand portion of the battery 47 through the coil 48, the contact 39, armature 37, secondary winding 36 of cable relay 34, correcting circuit 41 to the recording instrument 45 and back to the midpoint of battery 47. This circuit provides a locking circuit which maintains the armature 37 in engagement with its contact 39 under control of winding 36 during the remaining portion of the impulse period, notwithstanding the fact that no current flows through the winding 35 after period 58, Figure 4 when current ceases to flow in the secondary winding 3. As pointed out above, the current in winding 36 is sufficient to hold the armature 37 in engagement with its contact 39 during this period.

At the end of the impulse period, the sudden drop of signal current indicated at 59, Figure 3, produces a movement of the coil 1 in the opposite direction from that previously produced and as a result the coil is moved in the opposite direction thereby generating a voltage in the secondary winding 2 of opposite polarity from that produced at 58 as illustrated at 60. As a result, current flows to the amplifier 30 and thence over the conductors 31 and 32 to the winding 35 of the cable relay of opposite polarity from that originally described and of sufficient magnitude to overcome the holding effect of the current flowing through the secondary winding 36 over the locking circuit and the armature 37 is thereupon restored to its neutral position.

As the circuit through the local recording instrument was maintained throughout the entire period of the block signal by the locking winding 36, a block signal equivalent to the transmitted signal will be recorded, as indicated at Figure 5. Simultaneously a full length regenerated signal will be transmitted from battery 52 over conductor 53 to the local circuit.

It will be noted from the above description of the operation that received impulses operating the cable relay through a transformer magneto-generator are of a large magnitude, substantially equal to that impressed upon the cable due to the magnetic amplification produced in the motor generator action of the transformer coils. When, however, earth currents, which are of very low frequency, flow over the cable and through the primary winding 2 of the receiving instrument, there will be practically no transformer inductive effect between the windings 2 and 3 owing to the very slow rate of change in the current, and while the coil will tend to slowly move out of its neutral position, the slow rate of cutting the magnetic flux in the magnetic field is insufficient to generate any appreciable voltage. Hence the earth currents are not repeated into the secondary coil 3 and are not received by the cable relay.

Although I have described one particular means for carrying out my invention, it will be understood that any receiving arrangement which distinguishes in its operation, the steep wave front of a telegraph signal from low slope front of transient currents comes within the scope of this invention and I do not intend to limit myself by the specific modification shown only in so far as set forth in the appended claims.

I claim:

1. A telegraph receiver comprising a primary winding, a secondary winding, means for rotatably mounting said windings in a magnetic field, said primary winding being responsive to received telegraph signals for moving said primary and secondary windings in said magnetic field and means including said secondary winding responsive to said movement in said field for generating a voltage in said secondary in accordance with the rate of cutting the magnetic flux in said magnetic field.

2. In a telegraph receiver as recited in claim 1, said primary and secondary windings being positioned in inductive relation so that the currents flowing in said seondary winding are the resultant of currents induced by the currents in the primary winding and the currents generated by the rotation in said magnetic field.

3. In a telegraph system in which earth currents flow, means for transmitting telegraph signals, a transformer, comprising a primary and a secondary winding rotarily mounted in a magnetic field, the primary winding being connected in said telegraph system and receiving said telegraph signals, the characteristics of said transformer due to said rotation in a magnetic field being such that said received telegraph signals are repeated into said secondary winding while said earth currents are not repeated into said secondary winding.

4. In a telegraph system, a signaling line, a receiver embodying a transformer including a primary and a secondary winding, said primary winding being connected to said line and responding to received signals for rotating said secondary winding in a magnetic field whereby currents are generated in said secondary and means controlled by said current for reproducing said received signal.

5. In a telegraph receiver, a transformer including a primary winding connected in the signaling circuit, a secondary winding connected in a local circuit, said primary winding being arranged to rotate said secondary in a magnetic field in response to a received signal to thereby generate currents in accordance with the received signals, electro-magnetic means responsive to said currents generated in said secondary, a locking circuit therefor for maintaining said electromagnetic means energized when operated by said secondary currents, said transformer being responsive at the termination of said received signal for overcoming the holding effect of said locking circuit.

In testimony whereof I affix my signature.

GUY H. RIDGE.